United States Patent
Young et al.

(10) Patent No.: US 6,488,606 B1
(45) Date of Patent: Dec. 3, 2002

(54) LIMITED SLIP DIFFERENTIAL WITH SELF CONTAINED OIL SUPPLY

(75) Inventors: David Joseph Young, Kimmell, IN (US); Earl James Irwin, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/759,516

(22) Filed: Jan. 16, 2001

(51) Int. Cl.[7] ................................................. F16H 48/06
(52) U.S. Cl. ....................................................... 475/231
(58) Field of Search .............................. 74/606 R, 607; 475/231, 237

(56) References Cited

U.S. PATENT DOCUMENTS

| | | |
|---|---|---|
| 3,495,298 A | 2/1970 | Engle et al. |
| 3,742,784 A | 7/1973 | Engle |
| 3,815,442 A | 6/1974 | McAninch et al. |
| 3,896,684 A | 7/1975 | Duer |
| 4,221,138 A * | 9/1980 | Stewart et al. ................ 74/607 |
| 4,245,525 A | 1/1981 | Lebegue |
| 4,867,008 A * | 9/1989 | Yamaoka et al. ......... 74/606 R |
| 5,147,252 A * | 9/1992 | Mace et al. .................. 475/226 |
| 5,662,544 A * | 9/1997 | Schlosser et al. ........... 475/230 |
| 5,816,971 A * | 10/1998 | Zentmyer et al. ............. 475/84 |
| 6,076,646 A | 6/2000 | Burns |
| 6,095,939 A * | 8/2000 | Burns et al. .................. 475/88 |

* cited by examiner

Primary Examiner—Dirk Wright
(74) Attorney, Agent, or Firm—Liniak, Berenato & White

(57) ABSTRACT

A limited slip differential for vehicular applications that eliminates chattering noise from the differential while maintaining seal integrity. This is accomplished by the use of a differential casing that includes at least a pair of fluid seals isolating a first chamber for bathing the respective differential components in a fluid lubricant appropriate to the contained components. A fluid lubricant, such as one containing a friction modifier is particularly suitable for the array of friction plates and pads of a disk pack, but can be detrimental to sealing elements, such as about the pinion gear. The separate chambers allows for the use of different fluid lubricants.

9 Claims, 1 Drawing Sheet

LIMITED SLIP DIFFERENTIAL WITH SELF CONTAINED OIL SUPPLY

FIELD OF THE INVENTION

This invention is directed to the field of limited slip differentials of the type for connecting a vehicle's driving shaft to a pair of driven shafts, but more particularly to a limited slip differential that incorporates a self contained lubricant supply isolated from the lubricant disposed in the differential housing or carrier.

BACKGROUND OF THE INVENTION

The present invention relates to an improved limited slip differential of the type for use in vehicular applications, such as automobiles. By way of brief background, when an automobile goes around a corner, the outer driving wheel must be turned at a greater speed than the inner one. This is achieved through the differential. It lies midway between the two driving wheels, linked to each wheel by a half-shaft turned through a bevel gear. The half-shafts have sun gears connected by free-wheeling planet pinions. When traveling straight, the planet pinions do not spin and drive both half-shafts at the same speed. As the automobile corners, the planet pinions do spin, driving the sun gear and half-shafts at different speeds.

Such differential systems have been improved over the years. Of particular concern to automotive engineers is the problem of traction, such as when one driving wheel encounters ice, mud, or snow, and the like. In straight, dry driving conditions, the differential supplies equal torque to each half-shaft. However, when adverse driving conditions are encountered, such as operating on a slippery surface, prior art differentials, supplying equal torque to the driving wheels resulted in reduced traction even when only one driving wheel was exposed to the slippery road surface. This dangerous condition resulted in the development of differential systems that introduced a torque to the system. The respective developments have become what are known as limited slip differentials, where the following prior art represents the state of the art on limited slip differentials. Such prior art, listed as U.S. Patents, are as follows:

a.) U.S. Pat. No. 6,076,646, to Burns, discloses a hydraulic coupling for use in motor vehicle driveline applications to limit speed differentiation and transfer drive torque between two rotary members. The hydraulic coupling includes a multi-plate clutch assembly operably connecting the two relatively rotatable members, and a sealed actuator assembly for actuating the clutch assembly in response to the magnitude of speed differentiation between the two rotary members. The actuator assembly includes a hydraulic pump and a piston, which are sealed relative to the clutch assembly. The sealed actuator assembly includes an internal recirculation path for supplying hydraulic fluid retained therein between a low pressure supply chamber at the inlet side of the hydraulic pump and a high pressure piston chamber provided at the discharge side of the hydraulic pump. Hydraulic pressure in the piston chamber controls the magnitude of the clutch engagement force exerted by the piston on the clutch assembly. As a further feature, the recirculation path includes a flow restrictor which provides a bleed flow path for supplying high pressure fluid from the piston chamber to the supply chamber following cessation of the pumping action to release the clutch assembly.

b.) U.S. Pat. No. 4,245,525, to LeBegue, teaches a pair of differential side gears splined to separate driven shafts that rotate the driven wheels of a vehicle. Rotation of a driven shaft is transmitted through a differential case and spider gears to the side gears. The side gears are rotatably mounted on a thrust assembly. Belleville spring assemblies exert a biasing force upon interleaved clutch plates alternately spined to the case and the side gears. Upon the occurrence of an unequal torque distribution between the driven shafts the gear separating forces exerted by the spider gears upon the side gears become imbalanced. The side gear associated with the driven shaft of the wheel having reduced traction is displaced axially toward the spider gears. This axial movement is transmitted through the thrust assembly to the side gear associated with the driven shaft of the wheel having the greater traction to axially move the side gear and compress the clutch plates to frictionally engage the case and the side gear. Rotation is transmitted from the case through the clutch plates to the side gear to increase the torque of the driven shaft of the wheel having the greater traction and thereby rotate the wheel having the greater traction.

c.) U.S. Pat. No. 3,896,684, to Duer, relates to a non-chattering limited slip differential which includes a clutch pack with alternating clutch plates of two types, one type being a conventional annular clutch plate. The other type comprises inner and outer annular members joined in a neck section which allows relative movement between the members. The outer member has an indentation diametrically opposite the neck section and the inner member has a tab projecting radially outward into the indentation to limit the relative movement between the members.

While the prior art offer different approaches to improving the operation and performance of differentials for vehicular applications, none are directed to the unique system for a limited slip differential casing that contains separate chambers, isolated in fluid sealing relationship from one another, and specifically to a sealing arrangement that isolates the lubricant in the differential case from the lubricant in the differential carrier. The manner by which the present invention achieves these goals will become clearer in the specification which follows.

SUMMARY OF THE INVENTION

This invention relates to an improved limited slip differential, as employed in the driving mechanism of vehicles, and to a method for providing a limited slip differential that has reduced chattering noise without deteriorating seal integrity.

The invention comprises a lubricant containing rotating case receiving a pair of output shafts for rotating the vehicle wheels, and a side gear, pinion gear and friction plates for each of the output shafts. Power to the output shafts is achieved by the rotating case revolving the pinion gears which in turn rotate the side gears. The rotating case is rotatably disposed within a differential carrier.

The improved feature hereof is the provision of an isolated first chamber defined by the interior of the rotating case, isolated from the chamber defined between the differential case and the carrier, where each chamber bathes selected components within a separate lubricating medium. Specifically, the side gear, pinion gear and friction plates are positioned within a first of the chambers. Fluid seals are provided between each axle and the axle openings in the differential case (trunnions) to isolate the component and lubrication in first chamber from the components and lubrication in the second chamber. By this arrangement, the respective components in the different chambers may be bathed in fluid lubricants specific to the needs and requirements of the components.

In a preferred method, the first chamber containing the friction plates may include a friction modifier, an additive that can be detrimental to lubricant seals associated with and fluid sealing the second chamber. Further, removable means are provided to access and fill the respective chambers.

Accordingly, an object of the invention is the provision of a limited slip differential for vehicle applications, where the differential casing includes at least a pair of fluid seals isolating the first chamber within the differential case from the second chamber between the differential case and the carrier.

Another object hereof is a method of operating a limited slip differential containing different sets of components, where the respective sets are bathed in different fluid lubricants.

Still another object hereof is a convenient, removable means to fill and maintain the respective fluid sealed chambers.

These and other objects of this invention will become more apparent in the description which follows, particularly when read in conjunction with the accompanying drawing.

BRIEF DESCRIPTION OF DRAWING

The FIGURE is a sectional view, in side elevation, of a limited slip differential assembly, as may be used in operating and driving a pair of wheels of a vehicle, illustrating at least a pair of chambers isolated from one another for receiving different fluid lubricants for the contained components within each chamber according to the present invention.

DETAILED DESCRIPTION OF PREFERRED EMBODIMENT

Figure 1:
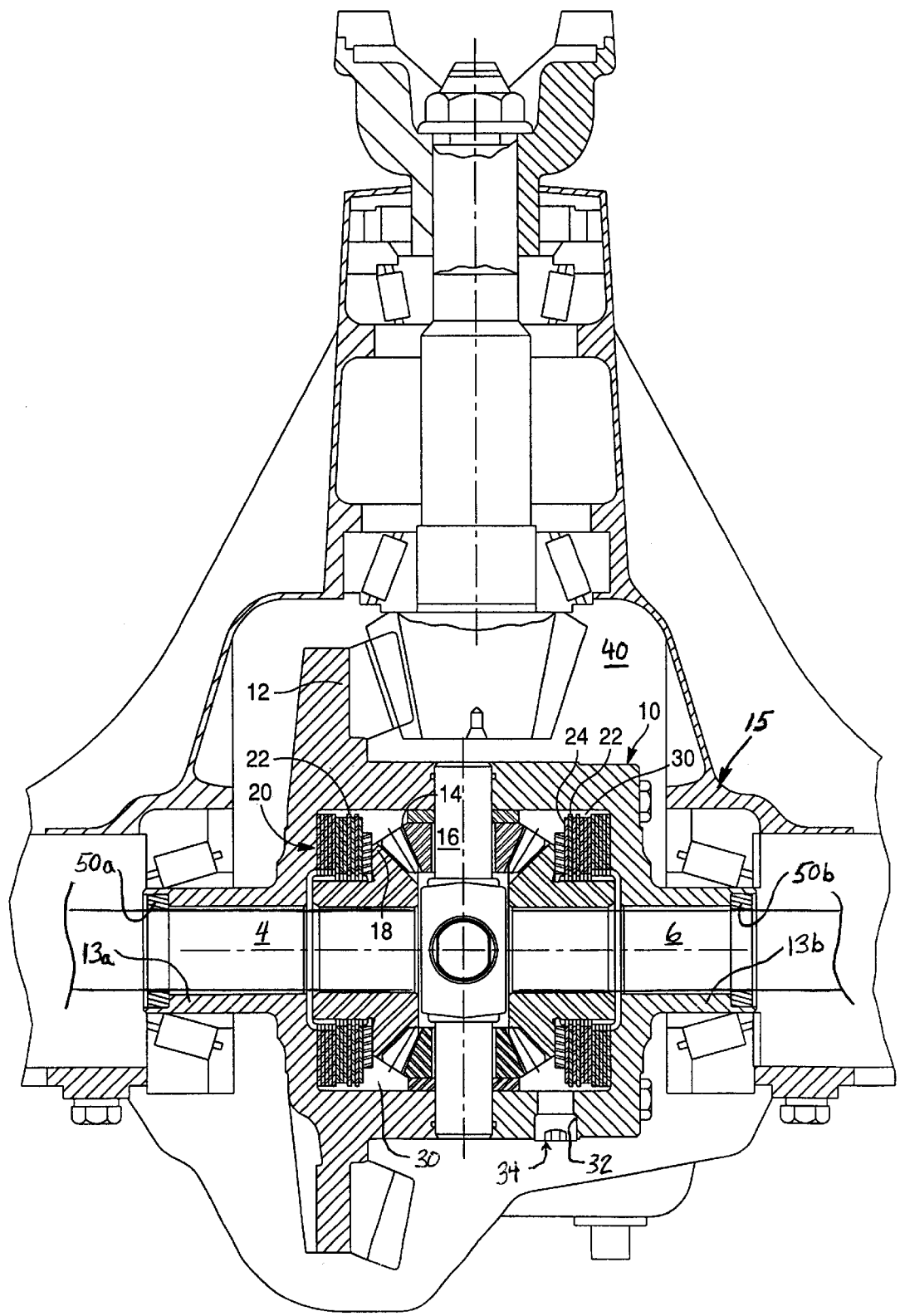

This invention is directed to an improved limited slip differential assembly of the type to control any differential torque between the driven wheels of a vehicle so equipped. The improvement resides in a limited slip differential that reduces or eliminates the noise of chattering while maintaining seal integrity. The proposed solution by the patentee thereof lies in the use of a set of seals 50a, 50b that isolate the interior chamber 30 of the closed-form differential case 10 from the chamber 40 defined between the differential carrier 15 and the interior of the differential case 10.

A conventional disk pack, as known in the art, comprises plural, alternating members, such as plural metal plates separated by, and contiguous with asbestos-type pads. To control torque between the pair of driven wheels the pads and plates are designed to slip relative to one another. The torque necessary to cause two adjacent pads/plates to move with respect to one another must overcome the force of static friction of the adjacent elements before the members can begin to slip with respect to one another. As the elements begin to slip, the friction between the adjacent elements changes the friction from static to dynamic. The components of the differential that bear the torque tend to unwind to reduce that torque to a level to balance the dynamic friction force between the members. This is an ongoing process for the typical vehicle with the friction force alternating between a static state and a dynamic state. It is believed that the alternating sticking and slipping of the disk pack elements results in a series of physical shocks that are transmitted through the drive train to the vehicle body, and ultimately heard or felt by the driver. Over any extended time, with the sticking and slipping of the disk pack elements, the noise or chattering can be an annoyance to the driver and passengers in the vehicle.

Most efforts directed to the chattering problem appear to have been directed to improving the fluid lubricants, i.e. oil, used in the differential housing whereby the fluid lubricants splash through the plurality of opening formed in the sides of the conventional differential case. One concern that helped lead to improved lubricants was the recognition that there was a lack of sufficient lubricant being supplied to the friction plates of the disk pack, caused by rapid rotation of the differential housing and the resultant centrifugal force on the lubricant. Oil additives were developed, such as friction modifiers, to meet the challenge of chattering. Unfortunately, it was discovered that friction modifiers were very hard on the oil seals within the differential housing or carrier. Thus, there were no suitable alternatives to meeting all the lubrication needs of a limited slip differential, one that would eliminate chattering while maintaining the integrity of the fluid seals.

The present invention offers a unique and distinctly different approach to the problem of chattering and lubricants. Such solution will now be detailed in the description which follows, where attention is further directed to the accompanying Figure.

Turning now to the Figure, there is illustrated the modified limited slip differential system of this invention whereby the closed chamber 30 within the case 10 is sealingly isolated from the chamber 40 defined by the carrier 15. Unlike standard differential case, the differential case of this invention defines a closed chamber 30 with openings only being provided at the trunnions 13a, 13b through which the axle shafts 4, 6 pass. The system hereof comprises a differential casing 10 having a radial flange 12 for mounting the ring gear 13. A pair of pinion gears 14 is rotatably supported by a pinion shaft 16 and recesses are provided in the case 10 to accommodate seals between the case 10 and the shaft 16. In intermeshing engagement with said pinion gears are a complementary pair of side gears 18, one each for connection to an output shaft, not shown, for transmitting rotational effort to said output shafts. By this arrangement, the intermeshing of the gears is such that the transmission of torque from the differential casing, pinion shaft and pinion gears results in an axial force component parallel to said output shafts.

Since a limited slip differential has for its purpose to control the torque between driven wheels, means are provided to control the rotation of the respective output shafts within the differential casing 10. By way of background, when one driven wheel is on a slippery surface. i.e. ice, or situated in mud or on loose gravel, and the other driven wheel is on dry pavement, for example, a free differential action would prevent the transmission of rotational effort to the driven wheel on the dry pavement.

The side gear 18 associated with the driven wheel having the traction would remain stationary and the pinion gears 14 would revolve about it in their circular path about the pinion shaft 16 resulting in rotation of only the driven wheel without traction. As a result, limited slip differentials were developed to include means for resisting differential action to the extent that an initial predetermined rotational effort can be applied to the driven wheel having the greater traction, in this example the one on the dry pavement, and further to the extent that an additional cumulative rotational effort will be applied to the "traction" wheel as a function of the input torque to the differential mechanism.

As the means for resisting the differential action, disk packs or clutch plates were developed. Disk packs, as known in the art, typically may comprise a series of metal plates 22 interspersed between pads 24 of asbestos-type material. The disk packs 20 are drivingly connected to a respective side gear 18, and as the side gears are splined to a respective output shaft, engagement of the disk pack 20 provides a means for transmission of rotational effort directly from the differential casing 10 to the output shafts. As is well understood in the operation of a limited slip differential mechanism, relative rotation between the output shafts is necessary to achieve certain results, such as when a vehicle using same must negotiate a corner or curve and one driven wheel must turn at a faster rate than the other. In this operation, it is necessary that the frictional engagement between the elements 22, 24 forming the disk pack must be overcome so that the relative movement between the respective output shafts may be effected. When this occurs, the disk pack elements 22, 24 must slip with respect to one another to allow relative movement of one output shaft to the other. In the more severe situation when one wheel loses traction, the elements of the one disk pack slip rapidly in opposite directions to the other disk pack elements. This is true even though the axial forces imparted to the elements by the side gears are relatively great.

It will be understood that excessive slippage between the dick pack elements 22, 24 can cause serious damage to the elements' contacting surfaces resulting in potential problems in the safe operation of the vehicle. To protect the contacting surfaces the disk packs are typically bathed in a lubricant, i.e. oil. However, particularly at high speeds, a further problem was noted and that was the centrifugal forces exerted on the system forced the lubricant away from the disk pack elements. As a consequence, new lubricants were developed, such as friction modifiers. While this represented a move in the right direction, it was further recognized that these new lubricants containing the friction modifiers were damaging to the seals within the differential carrier in the chamber between the differential carrier and the chamber defined by the interior of the differential case. Such seals may be found on the pinion gear shaft. Thus, two problems had to be faced, and the present invention met the challenge by the development of a differential casing containing at least a pair of fluid separating chambers for the rotating components of the limited slip differential of the invention, where a first said chamber 30 contains the components: disk packs, side gears, and pinion gears; and a second said chamber 40 is the space defined between the differential carrier 15 and the first chamber 30. Significantly, the first chamber 30 is isolated from the second chamber 40 by seals 50a, 50b disposed between the trunnions 13a, 13b and the axle shafts 4, 6 respectively passing therethrough. By providing the separate chambers, including a separate filling port 32, with removable plug 34, it is possible to provide different lubricants to the various components of the limited slip differential. Further, by the use of the separate chamber 30, one can maintain such chamber at capacity and thereby ensure the disk pack 20 is constantly bathed in its selected lubricant, even at high speeds. Such selected lubricant can include friction modifiers that have been found beneficial to the proper performance of the disk pack 20. Thus, by the fluid sealing of chamber 30 separated from other differential components external to the differential case, such as the sealing members, the sealing members are not exposed to the potential damaging effects of the friction modifiers. By this arrangement, the present invention meets the dual challenges of the prior art with an effective limited slip differential that is further free of chattering noise.

It is recognized that variations, modifications and changes may be made to the apparatus and method of this invention, particularly by those skilled in the art, without departing from the spirit and scope of this invention. Accordingly, no limitation is intended to be imposed thereon except as set forth in the appended claims.

What is claimed is:

1. In a limited slip differential assembly for motor vehicles, where the assembly is intended to limit speed differentiation and transfer drive torque between two driven wheels, said assembly comprising:

a differential carrier;

a lubricant-containing rotating differential case receiving a pair of output shafts for rotating said wheels, and receiving a pair of side bevel gears, a pair of pinion gears and friction plates for each said output shaft, where power to said output shafts is achieved by the rotating case revolving said pinion gears which in turn rotate said side gears, said case rotating relative to the carrier;

wherein in combination therewith an isolated chamber defined by said differential case contains said side gears, pinion gears and friction plates and contains a distinct lubricant isolated from a secondary chamber defined between said carrier and said rotating differential case.

2. The improvement according to claim 1, wherein said isolated chamber is further defined by sealing members disposed between said rotating case and said pair of output shafts.

3. The improvement according to claim 1, wherein said rotating case includes a wall having an opening to said isolated chamber and means for removably closing and sealing said isolated chamber.

4. The improvement according to claim 3, wherein said means for removably closing and sealing includes a removable plug disposed on said rotating case.

5. The improvement according to claim 4, wherein said friction plates are fully and operationally bathed in said fluid lubricant within said isolated chamber to eliminate chatter between the sliding elements of said friction plates.

6. In combination with a vehicle movable by at least a pair of driven wheels, the method of eliminating chattering noise during the operation of said vehicle, where said driven wheels are operable through a limited slip differential, said method comprising the steps of a) providing a differential carrier;

b) mounting a differential case containing a limited slip bevel-gear-type differential within said differential carrier;

c) inserting a pair of axles into opposing apertures provided in said differential case with a sealing interface being provided between said differential case and said axles to thereby define a first chamber within said differential case;

d) filling said first chamber with a fluid lubricant for bathing components of said limited slip differential; and e) closing said first chamber to isolate said chamber from a second chamber between said differential carrier and differential case.

7. The method according to claim 6, wherein said first chamber contains components including a pinion gear, side gear, and a disk pack in rotative sliding engagement with said side gear, and said components are bathed in a lubricant containing a friction modifier.

8. The method according to claim 7, wherein said second chamber contains a drive pinion and associated components.

9. The method according to claim 6, including the step of fluid sealing the first and second chambers from one another.

* * * * *